(12) United States Patent
Urano

(10) Patent No.: US 8,742,627 B2
(45) Date of Patent: Jun. 3, 2014

(54) WIRELESS POWER FEEDER

(75) Inventor: Takashi Urano, Tokyo (JP)

(73) Assignee: TDK Corporation, Tokyo (JP)

( * ) Notice: Subject to any disclaimer, the term of this patent is extended or adjusted under 35 U.S.C. 154(b) by 503 days.

(21) Appl. No.: 13/178,743

(22) Filed: Jul. 8, 2011

(65) Prior Publication Data

US 2012/0223585 A1   Sep. 6, 2012

Related U.S. Application Data

(60) Provisional application No. 61/447,857, filed on Mar. 1, 2011.

(51) Int. Cl.
H01F 27/42 (2006.01)

(52) U.S. Cl.
USPC .......................................................... 307/104

(58) Field of Classification Search
USPC .......................................................... 307/104
See application file for complete search history.

(56) References Cited

U.S. PATENT DOCUMENTS

| | | | |
|---|---|---|---|
| 7,741,734 | B2 | 6/2010 | Joannopoulos et al. |
| 2007/0222542 | A1 | 9/2007 | Joannopoulos et al. |
| 2008/0211320 | A1 | 9/2008 | Cook et al. |
| 2008/0278264 | A1 | 11/2008 | Karalis et al. |
| 2009/0015075 | A1 | 1/2009 | Cook et al. |
| 2009/0045772 | A1 | 2/2009 | Cook et al. |
| 2009/0051224 | A1 | 2/2009 | Cook et al. |
| 2009/0058189 | A1 | 3/2009 | Cook et al. |
| 2009/0072627 | A1 | 3/2009 | Cook et al. |
| 2009/0072628 | A1 | 3/2009 | Cook et al. |
| 2009/0072629 | A1 | 3/2009 | Cook et al. |
| 2009/0079268 | A1 | 3/2009 | Cook et al. |
| 2009/0102292 | A1 | 4/2009 | Cook et al. |
| 2009/0134712 | A1 | 5/2009 | Cook et al. |
| 2009/0167449 | A1 | 7/2009 | Cook et al. |
| 2009/0179502 | A1 | 7/2009 | Cook et al. |
| 2009/0195332 | A1 | 8/2009 | Joannopoulos et al. |
| 2009/0195333 | A1 | 8/2009 | Joannopoulos et al. |
| 2009/0212636 | A1 | 8/2009 | Cook et al. |
| 2009/0213028 | A1 | 8/2009 | Cook et al. |
| 2009/0224608 | A1 | 9/2009 | Cook et al. |
| 2009/0224609 | A1 | 9/2009 | Cook et al. |
| 2009/0224856 | A1 | 9/2009 | Karalis et al. |
| 2009/0243397 | A1 | 10/2009 | Cook et al. |
| 2009/0267709 | A1 | 10/2009 | Joannopoulos et al. |

(Continued)

FOREIGN PATENT DOCUMENTS

| JP | 2002-354712 | 12/2002 |
|---|---|---|
| JP | 2005-313884 | 11/2005 |

(Continued)

*Primary Examiner* — Robert L. Deberadinis
(74) *Attorney, Agent, or Firm* — McDermott Will & Emery LLP

(57) ABSTRACT

A wireless power feeder 116 feeds power by wireless from a feeding coil L2 to a receiving coil L3 using a magnetic field resonance phenomenon. A power transmission control circuit 200 supplies AC power at a drive frequency fo to the feeding coil L2, thereby making the feeding coil L2 feed the AC power to the receiving coil L3. A phase detection circuit 150 detects the phase difference between the voltage phase and current phase of the AC power. Concretely, the phase detection circuit compares a first detection time period during which a signal T2 assumes a high level and a second detection time period during which a signal S2 assumes a high level and detects the length of the time period in which the first and second detection periods overlap each other to detect the phase difference.

12 Claims, 16 Drawing Sheets

(56) References Cited

U.S. PATENT DOCUMENTS

| | | |
|---|---|---|
| 2009/0267710 A1 | 10/2009 | Joannopoulos et al. |
| 2009/0273242 A1 | 11/2009 | Cook |
| 2009/0284083 A1 | 11/2009 | Karalis et al. |
| 2010/0038970 A1 | 2/2010 | Cook et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Joannopoulos et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |

FOREIGN PATENT DOCUMENTS

| | | |
|---|---|---|
| JP | 2006-074848 | 3/2006 |
| JP | 2006-230032 | 8/2006 |
| JP | 4140208 | 6/2008 |
| JP | 2008-288889 | 11/2008 |
| JP | 2009-071909 | 4/2009 |
| JP | 2009-106136 | 5/2009 |
| JP | 2009-261104 | 11/2009 |
| JP | 2009-261105 | 11/2009 |
| JP | 4453741 | 2/2010 |
| JP | 2010-063245 | 3/2010 |
| JP | 2010-104159 | 5/2010 |
| JP | 2010-130878 | 6/2010 |
| JP | 2010-166693 | 7/2010 |
| JP | 4557045 | 7/2010 |
| JP | 2010-173503 | 8/2010 |
| JP | 2010-219838 | 9/2010 |
| JP | 2010-233442 | 10/2010 |
| JP | 2010-239690 | 10/2010 |
| JP | 2010-239769 | 10/2010 |
| JP | 2010-239777 | 10/2010 |
| JP | 2010-239816 | 10/2010 |
| JP | 2010-239838 | 10/2010 |
| JP | 2010-239847 | 10/2010 |
| JP | 2010-239848 | 10/2010 |
| JP | 2010-252446 | 11/2010 |
| JP | 2010-267917 | 11/2010 |
| JP | 2010-268664 | 11/2010 |
| JP | 2010-268665 | 11/2010 |
| JP | 2010-272412 | 12/2010 |
| JP | 2010-288441 | 12/2010 |
| JP | 2011-003947 | 1/2011 |
| WO | WO 2006/022365 A1 | 3/2006 |
| WO | WO 2007/008646 | 1/2007 | a range of two boundary values of minimum and

WIRELESS POWER FEEDER

RELATED APPLICATIONS

This application claims priority of U.S. Provisional Application No. 61/447,857 filed Mar. 1, 2011. The disclosure of this application including the specification, the drawings, and the claims are hereby incorporated by reference in their entirety.

BACKGROUND OF THE INVENTION

Field of the Invention

The present invention relates to wireless power feeding and, more particularly, to power control thereof.

A wireless power feeding technique of feeding power without a power cord is now attracting attention. The current wireless power feeding technique is roughly divided into three: (A) type utilizing electromagnetic induction (for short range); (B) type utilizing radio wave (for long range); and (C) type utilizing resonance phenomenon of magnetic field (for intermediate range).

The type (A) utilizing electromagnetic induction has generally been employed in familiar home appliances such as an electric shaver; however, it can be effective only in a short range of several centimeters. The type (B) utilizing radio wave is available in a long range; however, it cannot feed big electric power. The type (C) utilizing resonance phenomenon is a comparatively new technique and is of particular interest because of its high power transmission efficiency even in an intermediate range of about several meters. For example, a plan is being studied in which a receiving coil is buried in a lower portion of an EV (Electric Vehicle) so as to feed power from a feeding coil in the ground in a non-contact manner. The wireless configuration allows a completely insulated system to be achieved, which is especially effective for power feeding in the rain. Hereinafter, the type (C) is referred to as "magnetic field resonance type".

The magnetic field resonance type is based on a theory published by Massachusetts Institute of Technology in 2006 (refer to Patent Document 1). In Patent Document 1, four coils are prepared. The four coils are referred to as "exciting coil", "feeding coil", "receiving coil", and "loading coil" in the order starting from the feeding side. The exciting coil and feeding coil closely face each other for electromagnetic coupling. Similarly, the receiving coil and loading coil closely face each other for electromagnetic coupling. The distance (intermediate distance) between the feeding coil and receiving coil is larger than the distance between the exciting coil and feeding coil and distance between the receiving coil and loading coil. This system aims to feed power from the feeding coil to receiving coil.

When AC power is fed to the exciting coil, current also flows in the feeding coil according to the principle of electromagnetic induction. When the feeding coil generates a magnetic field to cause the feeding coil and receiving coil to magnetically resonate, large current flows in the receiving coil. At this time, current also flows in the loading coil according to the principle of electromagnetic induction, and power is taken out from a load connected in series to the loading coil. By utilizing the magnetic field resonance phenomenon, high power transmission efficiency can be achieved even if the feeding coil and receiving coil are largely spaced from each other.

CITATION LIST

Patent Document

[Patent Document 1]
U.S. Patent Application Publication No. 2008-0278264
[Patent Document 2]
Jpn. Pat. Appln. Laid-Open Publication No. 2006-230032
[Patent Document 3]
International Publication No. WO2006-022365
[Patent Document 4]
U.S. Patent Application Publication No. 2009-0072629
[Patent Document 5]
Jpn. Pat. Appln. Laid-Open Publication No. 2006-74848

The present inventor considers that a mechanism for automatically controlling feeding power to stabilize output power is required in order to extend the applicability of wireless power feeding. In a non-contact type power feeder disclosed in Patent Document 5, which is included in the type (A), a secondary side unit on the receiving side notifies a primary side unit on the transmission side of the magnitude of output voltage, and the primary side unit controls feeding power in accordance with the output voltage. More specifically, an electromagnetic wave signal indicating the magnitude of the output voltage is transmitted from a coil L4 (secondary side unit) to a coil L3 (primary side unit).

In the case of the magnetic resonance type, a strong electromagnetic field generated between the feeding coil and receiving coil exerts significant influence on a signal. Thus, the mechanism disclosed in Patent Document 5 cannot directly be applied to the magnetic field resonance type. Further, in the case of Patent Document 5, a means for the power receiving side to transmit information to the power feeding side is required, complicating the system configuration.

SUMMARY

A main object of the present invention is to effectively control feeding power in wireless power feeding of a magnetic field resonance type.

A wireless power feeder according to the present invention feeds power by wireless from a feeding coil to a receiving coil using a magnetic field resonance phenomenon between the feeding coil and receiving coil. The wireless power feeder comprises: the feeding coil; a power transmission control circuit that supplies AC power at a drive frequency to the feeding coil so as to make the feeding coil feed AC power to the receiving coil; and a phase detection circuit that detects the phase difference between the voltage phase and current phase of the AC power. The phase detection circuit detects the deviation between a first detection period during which the voltage level of the AC power falls within a predetermined range and a second detection period during which the current level of the AC power falls within a predetermined range to detect the phase difference.

The "magnetic field resonance phenomenon between the feeding coil and receiving coil" refers to a resonance phenomenon occurring in a receiving coil circuit based on an AC magnetic field generated by a feeding coil. When AC power of a drive frequency is supplied to the feeding coil, the feeding coil generates an AC magnetic field of a drive frequency. Based on this AC magnetic field, the feeding coil and receiving coil are coupled (magnetically coupled) to each other mainly by a magnetic field component to make the receiving coil circuit resonate.

The "predetermined range" mentioned here is not limited to a range defined by two boundary values of minimum and maximum values, but may include a range defined by one boundary value of a predetermined minimum value or more or a predetermined maximum value or less.

When the drive frequency of the power transmission control circuit and resonance frequency are made coincide with each other, the power transmission efficiency in the entire system can be enhanced. By detecting the phase difference between the current and voltage of the AC power, it is possible to monitor whether a resonant state is maintained or not. Adopting a configuration in which two periods of the first and second detection periods are compared to detect the phase difference simplifies the entire control operation.

The phase detection circuit may detect the length of the period specified as the exclusive OR of the first and second detection periods to detect the phase difference. The deviation between the first and second detection periods may be specified by other logical operations such as logical AND or logical OR.

The power transmission control circuit may adjust the drive frequency so as to reduce the detected phase difference. By making the drive frequency track the resonance frequency, it is possible to easily maintain the power transmission efficiency at a high level.

The phase detection circuit may rectify both or one of the voltage waveform and current waveform into a digital waveform before detecting the phase difference. The phase detection circuit may detect the phase difference after shifting one of the phases of the voltage waveform and current waveform.

The phase detection circuit may detect the phase difference after frequency-dividing of the current waveform. Further, the phase detection circuit may detect the phase difference after frequency-dividing of the voltage waveform. The frequency division of the current waveform or voltage waveform facilitates adjustment of the duty ratio thereof.

The phase detection circuit may generate a DC signal representing the magnitude of the deviation between the first and second detection periods and detect the phase difference based on the level of the DC signal.

The power transmission control circuit may make the feeding coil that does not substantially resonate with circuit elements on the power feeding side feed the AC power to the receiving coil. The "does not substantially resonate" mentioned here means that the resonance of the feeding coil is not essential for the wireless power feeding, but does not mean that even an accidental resonance of the feeding coil with some circuit element is eliminated.

A configuration may be possible in which the feeding coil does not constitute a resonance circuit that resonates with power feeding side circuit elements at a resonance point corresponding to the resonance frequency of the receiving coil. Further, a configuration may be possible in which no capacitor is connected in series or in parallel to the feeding coil.

The power transmission control circuit may directly supply the AC power to the feeding coil not through a coupling transformer.

It is to be noted that any arbitrary combination of the above-described structural components and expressions changed between a method, an apparatus, a system, etc. are all effective as and encompassed by the present embodiments.

According to the present invention, it is possible to easily perform control of transmission power in an efficient manner in wireless power feeding of a magnetic field resonance type.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

A preferred embodiment of the present invention will be described below with reference to the accompanying drawings.

First Embodiment

Figure 1:
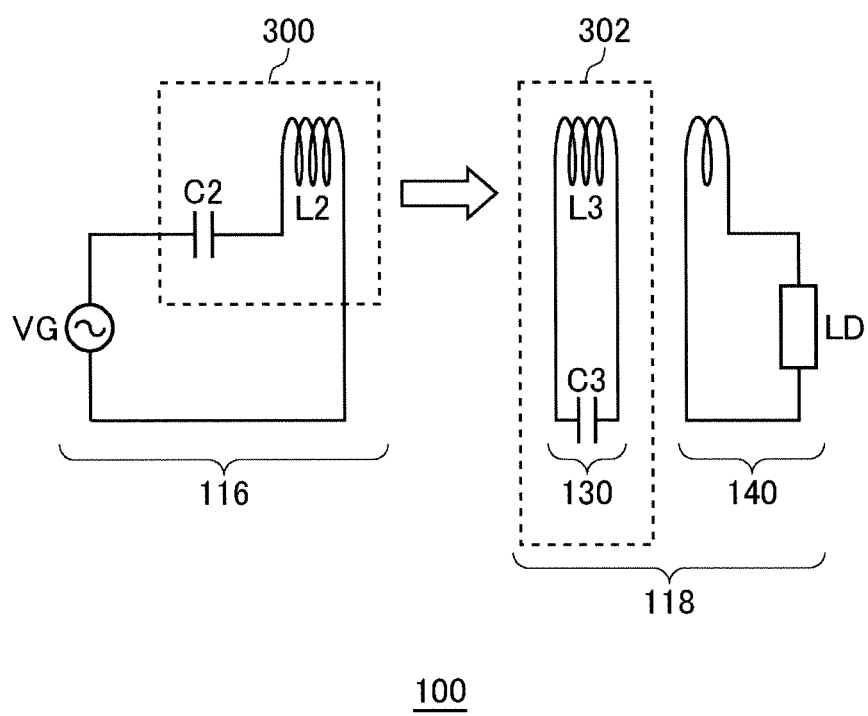
FIG. 1 is a view illustrating operation principle of a wireless power transmission system according to a first embodiment of the present invention.

FIG. 1 is a view illustrating operation principle of a wireless power transmission system 100 according to the first and second embodiment. The wireless power transmission system 100 in the first embodiment includes a wireless power feeder 116 and a wireless power receiver 118. The wireless power feeder 116 includes a power feeding LC resonance circuit 300. The wireless power receiver 118 includes a receiving coil circuit 130 and a loading circuit 140. A power receiving LC resonance circuit 302 is formed by the receiving coil circuit 130.

The power feeding LC resonance circuit 300 includes a capacitor C2 and a feeding coil L2. The power receiving LC resonance circuit 302 includes a capacitor C3 and a receiving coil L3. The values of the capacitor C2, feeding coil L2, capacitor C3, and receiving coil L3 are set such that the resonance frequencies of the feeding LC resonance circuit 300 and receiving LC resonance circuit 302 coincide with each other in a state where the feeding coil L2 and receiving coil L3 are disposed away from each other far enough to ignore the magnetic field coupling therebetween. This common resonance frequency is assumed to be fr0.

In a state where the feeding coil L2 and receiving coil L3 are brought close to each other in such a degree that they can be magnetic-field-coupled to each other, a new resonance circuit is formed by the power feeding LC resonance circuit 300, power receiving LC resonance circuit 302, and mutual inductance generated between them. The new resonance circuit has two resonance frequencies fr1 and fr2 (fr1<fr0<fr2) due to the influence of the mutual inductance. When the wireless power feeder 116 supplies AC power from a power feeding source VG to the power feeding LC resonance circuit 300 at the resonance frequency fr1, the power feeding LC resonance circuit 300 constituting a part of the new resonance circuit resonates at a resonance point 1 (resonance frequency fr1). When the power feeding LC resonance circuit 300 resonates, the feeding coil L2 generates an AC magnetic field of the resonance frequency fr1. The power receiving LC resonance circuit 302 constituting apart of the new resonance circuit also resonates by receiving the AC magnetic field. When the power feeding LC resonance circuit 300 and power receiving LC resonance circuit 302 resonate at the same resonance frequency fr1, wireless power feeding from the feeding coil L2 to receiving coil L3 is performed with the maximum power transmission efficiency. Received power is taken from a load LD of the wireless power receiver 118 as output power. Note that the new resonance circuit can resonate not only at the resonance point 1 (resonance frequency fr1) but also at a resonance point 2 (resonance frequency fr2).

Although FIG. 1 illustrates a configuration in which the wireless power feeder 116 does not include an exciting coil, the basic operation principle of the wireless power feeder 116 is the same as in the case where the wireless power feeder 116 includes the exciting coil.

Figure 2:
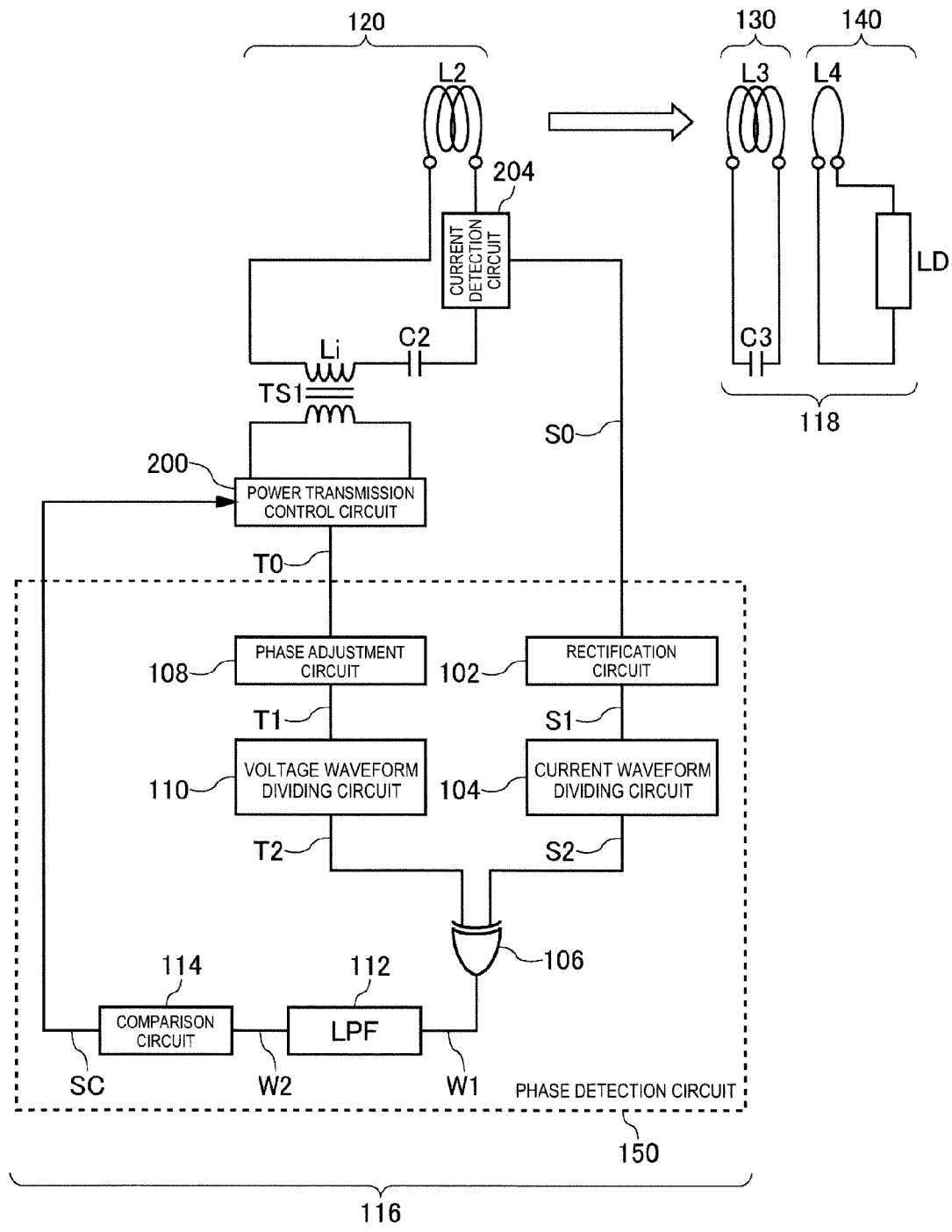
FIG. 2 is a view schematically illustrating the wireless power transmission system according to the first embodiment.

FIG. 2 is a view schematically illustrating the wireless power transmission system 100 according to the first embodiment. A power transmission control circuit 200 functions as an AC power supply and supplies AC power of a drive frequency fo to a feeding coil circuit 120 through a coupling transformer TS1. A current detection circuit 204 measures the phase of AC current flowing in the feeding coil L2. A phase detection circuit 150 compares the phase of AC voltage Vo generated by the power transmission control circuit 200 and current phase detected by the current detection circuit 204. When the drive frequency fo coincides with the resonance frequency fr1, the current phase and voltage phase coincide with each other. When the phase detection circuit 150 detects a deviation (phase difference) between the current phase and voltage phase, the power transmission control circuit 200 adjusts the drive frequency fo so as to eliminate the deviation between the drive frequency fo and resonance frequency fr1. With the above configuration, the wireless power feeder 116 makes the drive frequency fo to track the resonance frequency fr1.

The wireless power receiver 118 includes a receiving coil circuit 130 and a loading circuit 140. In the receiving coil circuit 130, the power receiving LC resonance circuit 302 is formed by a receiving coil L3 and a capacitor C3.

A signal S0 representing a current waveform (analog waveform) detected by the current detection circuit 204 is rectified into a signal of a digital waveform by a rectification circuit 102 to be a signal S1. The signal S1 is frequency-divided by ½ by a current waveform dividing circuit 104 to be a signal S2. The signal S2 is to be input to a two-input EXOR circuit 106. The details of the roles of the rectification circuit 102 and current waveform dividing circuit 104 will be described later.

On the other hand, a signal T0 representing a voltage waveform (digital waveform) of AC voltage Vo generated by power transmission control circuit 200 is delayed by 90° by a phase adjustment circuit 108 to be a signal T1. The signal T1 is frequency-divided by ½ by a voltage waveform dividing circuit 110 to be a signal T2. The signal T2 is to be input to the EXOR circuit 106. The details of the roles of the phase adjustment circuit 108 and voltage waveform dividing circuit 110 will be described later.

The EXOR circuit 106 outputs an output signal W1. The signal W1 assumes a high level when one of the signals T2 and S2 assumes a high level and the other one assumes a low level and, otherwise, assumes a low level. That is, the signal W1 is the exclusive OR of the signals T2 and S2. The signal W1 is smoothed (converted into a DC signal) to be a DC signal W2 by low pass filter 112. The signal W2 is compared with reference voltage Vref in a comparison circuit 114, and the comparison result is a signal SC. The power transmission control circuit 200 changes the drive frequency fo in accordance with the signal SC.

When the drive frequency fo and resonance frequency fr1 coincide with each other, the signal SC becomes zero, so the drive frequency fo does not change. On the other hand, when the drive frequency fo and resonance frequency fr1 deviate from each other, the signal SC becomes non-zero with the result that the drive frequency fo is adjusted toward the resonance frequency fr1. With such a mechanism, even though the system is put into a non-resonant state for some reason, a resonant state can autonomously be recovered. A more detailed mechanism will be described later.

Figure 3:
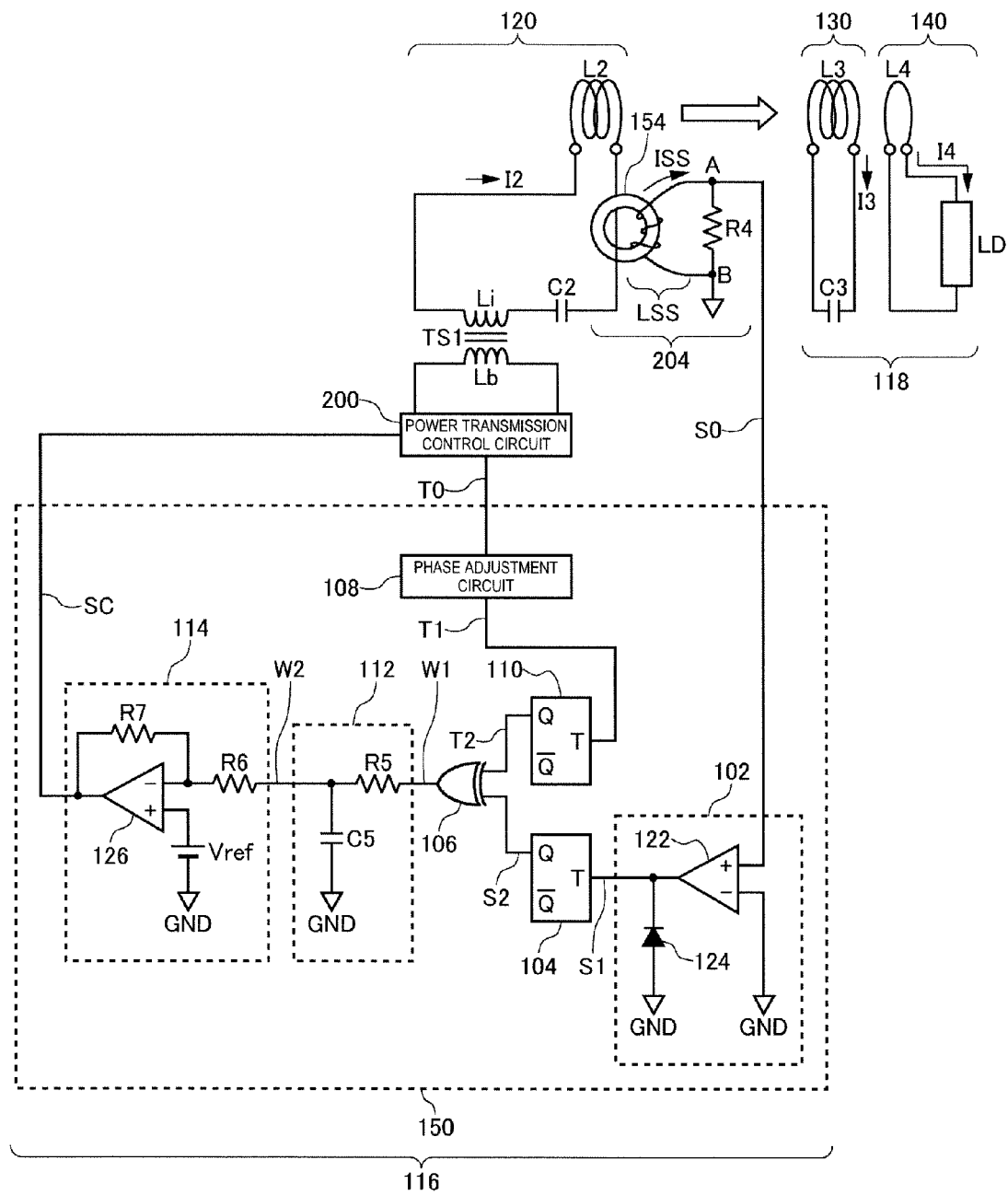
FIG. 3 is a system configuration view of the wireless power transmission system according to the first embodiment.

FIG. 3 is a system configuration view of the wireless power transmission system 100 according to the first embodiment. The wireless power feeder 116 includes, as basic components, a power transmission control circuit 200, a feeding coil circuit 120, and a phase detection circuit 150. The wireless power receiver 118 includes a receiving coil circuit 130 and a loading circuit 140. In FIG. 3, a configuration of the wireless power transmission system 100 is described mainly, and concrete operation thereof will be described in detail with reference to FIG. 7 and subsequent drawings.

A distance (inter-coil distance) of about 0.01 m to 0.03 m is provided between the feeding coil L2 of the feeding coil circuit 120 and receiving coil L3 of the receiving coil circuit 130. The wireless power transmission system 100 mainly aims to feed AC power from the feeding coil L2 to receiving coil L3 by wireless. In the present embodiment, a description will be made assuming that resonance frequency fr1 in the case where the inter-coil distance is 22 mm is 149.1 kHz. The wireless power transmission system according to the present embodiment may be made to operate in a high-frequency band like ISM (Industry-Science-Medical) frequency band.

The feeding coil circuit 120 is a circuit in which the feeding coil L2, capacitor C2, and a transformer TS1 secondary coil Li are connected in series. The transformer TS1 secondary coil Li constitutes, together with a transformer TS1 primary coil Lb, the coupling transformer TS1 and receives AC power from the power transmission control circuit 200 by electromagnetic induction. AC current I2 flows in the feeding coil circuit 120.

The receiving coil circuit 130 is a circuit in which the receiving coil L3 and capacitor C3 are connected in series.

The feeding coil L2 and receiving coil L3 face each other. The feeding coil L2 and receiving coil L3 need not have the same shape. When the feeding coil L2 generates an AC magnetic field at the resonance frequency fr1, the feeding coil L2 and receiving coil L3 are magnetic-field coupled to each other, causing current I3 to flow in the receiving coil circuit 130. The receiving coil circuit 130 is also brought into resonance by an AC magnetic field generated by the feeding coil L2.

The loading circuit 140 is a circuit in which a loading coil L4 and load LD are connected in series. The receiving coil L3 and loading coil L4 face each other. The distance between the receiving coil L3 and loading coil L4 is zero. Thus, the receiving coil L3 and loading coil L4 are electromagnetically strongly coupled to each other (coupled by electromagnetic induction). When the current I3 is made to flow in the receiving coil L3, an electromotive force occurs in the loading circuit 140 to cause AC current I4 to flow in the loading circuit 140. The AC current I4 flows in the load LD.

The AC power fed from the feeding coil L2 of the wireless power feeder 116 is received by the receiving coil L3 of the wireless power receiver 118 and is then extracted from the load LD.

When the load LD is directly connected to the receiving coil circuit 130, the Q-value of the receiving coil circuit 130 is degraded. Therefore, the receiving coil circuit 130 for power reception and loading circuit 140 for power extraction are separated from each other. In order to enhance the power transmission efficiency, the center lines of the feeding coil L2, receiving coil L3, and loading coil L4 are preferably made to coincide with one another.

The power transmission control circuit 200 functions as an "AC power supply" that generates the AC voltage Vo of the drive frequency fo. Although the waveform of the AC voltage Vo may be a sine wave, it is assumed here that the voltage waveform is a rectangular wave (digital waveform). The power transmission control circuit 200 dynamically changes the drive frequency fo based on the signal SC output from the phase detection circuit 150.

When the power transmission control circuit 200 supplies AC voltage Vo at the drive frequency fo, the AC current of the drive frequency fo flows in the transformer TS1 primary coil Lb, so that the AC current I2 flows also in the feeding coil circuit 120 at the drive frequency fo. The closer the drive frequency fo is to the resonance frequency fr1, the higher the power transmission efficiency becomes. When the drive frequency fo coincides with the resonance frequency fr1, the feeding coil L2 and receiving coil L3 are strongly magnetic-field coupled to each other. At this time, the maximum transmission efficiency can be obtained.

The resonance frequency fr1 slightly changes depending on use condition or use environment of the receiving coil circuit 130. Further, in the case where the receiving coil circuit 130 is replaced with new one, the resonance frequency fr1 changes. Alternatively, there may be case where the resonance frequency fr1 needs to be changed aggressively by making the electrostatic capacitance of the capacitor C3 variable. Further, the resonance frequency fr1 changes depending on the distance between the feeding coil L2 and receiving coil L3. When the difference between the resonance frequency fr1 and drive frequency fo changes, the power transmission efficiency also changes. When the power transmission efficiency changes, the voltage (output voltage) of the load LD also changes. Thus, in order to maximize and/or stabilize the output voltage of the load LD, it is necessary to make the drive frequency fo to track the resonance frequency fr1 even when the resonance frequency fr1 changes.

A detection coil LSS is provided at the feeding coil circuit 120. The detection coil LSS is a coil wound around a core 154 (toroidal core) having a penetration hole NS times. The core 154 is formed of a known material such as ferrite, silicon steel, or permalloy. The number of windings NS of the detection coil LSS in the present embodiment is 100.

A part of the current path of the feeding coil circuit 120 penetrates the penetration hole of the core 154. This means that the number of windings NP of the feeding coil circuit 120 with respect to the core 154 is one. With the above configuration, the detection coil LSS and feeding coil L2 constitute a coupling transformer. An AC magnetic field generated by the AC current I2 of the feeding coil L2 causes inductive current ISS having the same phase as that of the current I2 to flow in the detection coil LSS. The magnitude of the inductive current ISS is represented by $I2 \cdot (NP/NS)$ according to the law of equal ampere-turn.

A resistor R4 is connected to both ends of a detection coil LSS. A one end B of the resistor R4 is grounded, and potential VSS (signal S0) of the other end A thereof is supplied to the rectification circuit 102.

The rectification circuit 102 includes a comparator 122. The signal S0 (analog current waveform) is digitized by the comparator 122 to be a signal S1 of a digital waveform. A diode 124 is connected so as to cut a negative component of the signal S1. The comparator 122 outputs a saturated voltage of 3.0 (V) when the signal S0 exceeds a predetermined threshold, e.g., 0.1 (V). The current I2 and inductive current ISS have the same phase, and inductive current ISS and potential VSS (signal S0) have the same phase. Therefore, by observing the waveform of the signal S0 or S1, the current phase of the AC current to be supplied from the feeding coil circuit 120 to receiving coil circuit 130 can be measured.

The signal S1 is further input to the current waveform dividing circuit 104. The current waveform dividing circuit 104 in the present embodiment is so-called a T-type flip-flop circuit. When the digital signal S1 changes from a high level to a low level, i.e., at the timing of the falling edge of the signal S1, the signal S2 which is the output of the current waveform dividing circuit 104 is toggled (inverted). As a result, the frequency of the signal S1 is divided (reduced) by ½ to be the signal S2. The role of the current waveform dividing circuit 104 is not to change the frequency of the signal S1, but to create the signal S2 of a duty ratio of concise 50%. Even though the duty ratio of the signal S1 is not 50%, it is possible to create the signal S2 of a duty ratio of 50% based on the falling edge of the signal S1. The details will be described later with reference to FIG. 7. The signal S2 is input to the EXOR circuit 106.

The signal T0 (digital voltage waveform) generated by the power transmission control circuit 200 is delayed by 90° by the phase adjustment circuit 108 to be the signal T1. The signal T1 is frequency-divided by ½ by the voltage waveform dividing circuit 110 to be the signal T2. The role of the voltage waveform dividing circuit 110 is also to create the signal T2 of a duty ratio of concise 50%, and the value of ½ has no special meaning. The signal T2 is input to the EXOR circuit 106.

The EXOR circuit 106 outputs the signal W1 which is the exclusive OR of the signals T2 and S2. The signal W1 is converted into a DC signal by a low-pass filter 112 to be the DC signal W2. The low-pass filter 112 is a well-known type circuit including a resistor R5 and a capacitor C5. The signal W2 is input to the comparison circuit 114. The comparison circuit 114 includes resistors R6, R7 and a comparator 126. The reference voltage Vref is supplied to the non-inversion input terminal of the comparator 126, and signal W2 is supplied to the inversion input terminal thereof. When the levels of the reference voltage Vref and signal W2 (DC voltage signal) are equal to each other, the comparison circuit 114 outputs the signal SC (=0). When the level of the reference voltage Vref is higher than that of the signal W2, the comparison circuit 114 outputs the signal SC (>0). When the level of the reference voltage Vref is lower than that of the signal W2, the comparison circuit 114 outputs the signal SC (<0). The power transmission control circuit 200 recognizes the magnitude of deviation between the voltage phase and current phase based on the magnitude of the signal SC so as to adjust the drive frequency fo.

Figure 4:
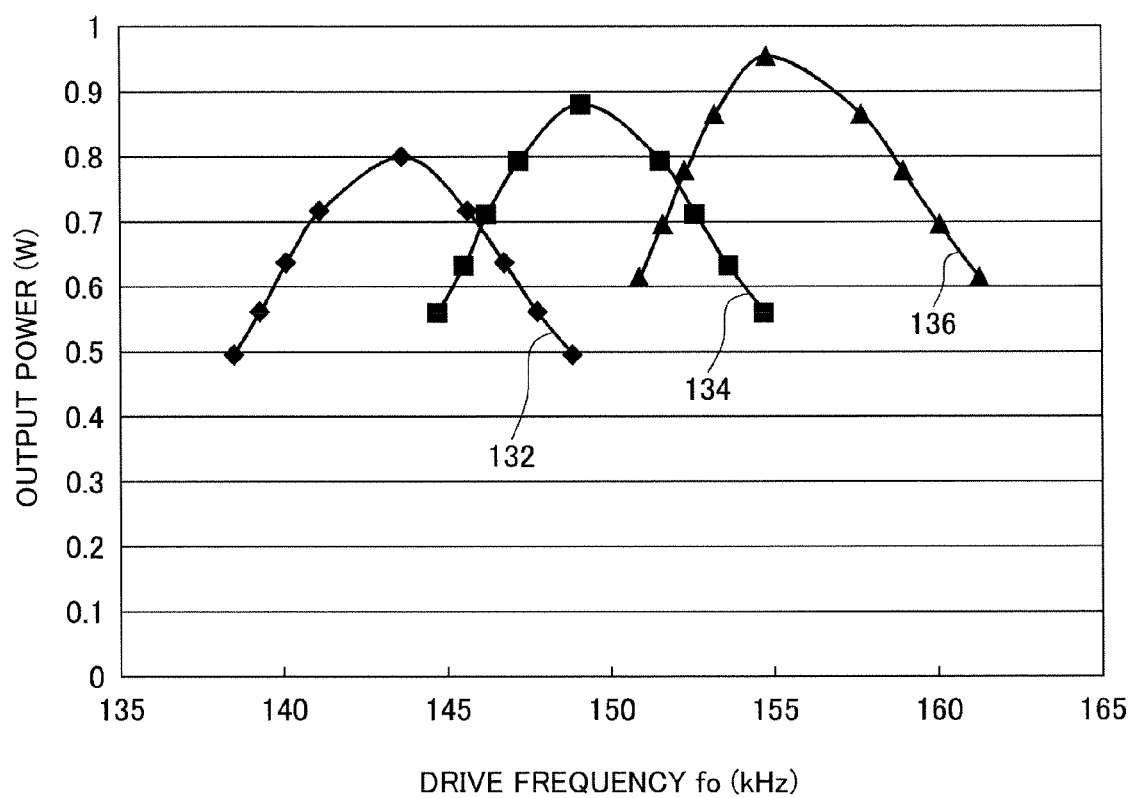
FIG. 4 is a graph illustrating the relationship among drive frequency, output power, and inter-coil distance.

FIG. 4 is a graph illustrating the relationship among the drive frequency fo, output power, and inter-coil distance. The output power mentioned here refers to the magnitude of the power extracted from the load LD. A short distance characteristic curve 132 represents the relationship between the drive frequency fo and output power when the inter-coil distance is 14 mm. In the case of the short distance characteristic curve 132, the maximum output power is obtained when the drive frequency fo is 143.6 kHz. In other words, the resonance frequency fr1 when the inter-coil distance is 14 mm is 143.6 kHz. An intermediate distance characteristic curve 134 represents the relationship between the drive frequency fo and output power when the inter-coil distance is 22 mm. The resonance frequency fr1 at this time is 149.1 kHz. A long distance characteristic curve 136 represents the relationship between the drive frequency fo and output power when the inter-coil distance is 30 mm. The resonance frequency fr1 at this time is 154.8 kHz. The smaller the inter-coil distance, the smaller the resonance frequency fr1 becomes.

Figure 5:
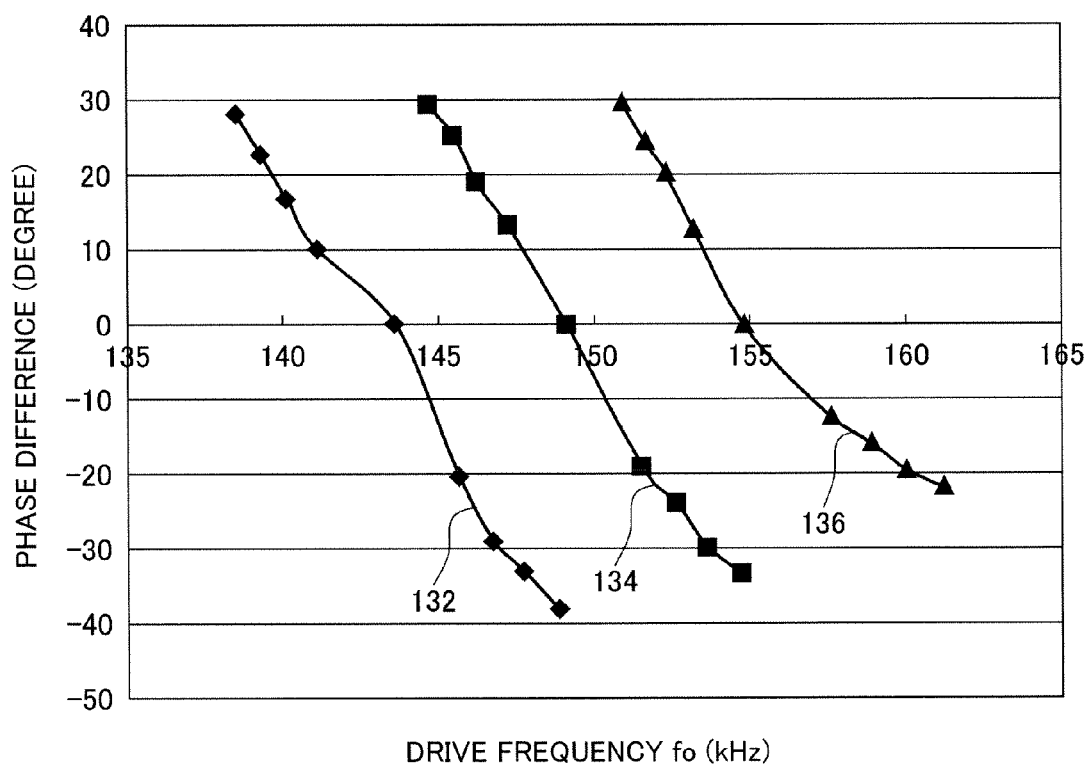
FIG. 5 is a graph illustrating the relationship among drive frequency, phase difference, and inter-coil distance.

FIG. 5 is a graph illustrating the relationship among the drive frequency fo, phase difference, and inter-coil distance. The phase difference mentioned here refers to the deviation between the current phase and voltage phase. In the case of the short distance characteristic curve 132, the phase difference becomes zero when the drive frequency fo is 143.6 kHz. In other words, the resonance frequency fr1 when the inter-coil distance is 14 mm is 143.6 kHz. In the cases of the intermediate distance characteristic curve 134 and long distance characteristic curve 136, the phase difference becomes zero when the resonance frequency fr1 is 149.1 kHz and 154.8 kHz, respectively.

Figure 6:
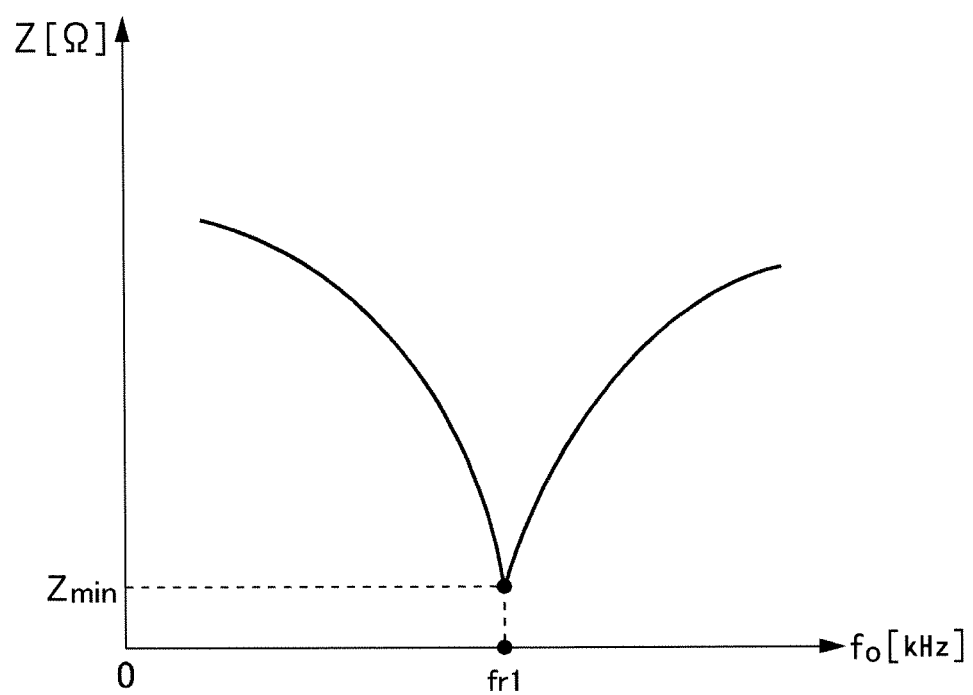
FIG. 6 is a graph illustrating the relationship between the impedance of a power receiving LC resonance circuit and drive frequency.

FIG. 6 is a graph illustrating a relationship between the impedance Z of the power receiving LC resonance circuit 302 and drive frequency fo. The vertical axis represents the impedance Z of the power receiving LC resonance circuit 302 (a circuit in which the capacitor C3 and the receiving coil L3 are connected in series). The horizontal axis represents the drive frequency fo. The impedance Z is a minimum value Zmin at the resonance state. Although Zmin=0 at the resonance state is ideal, Zmin does not become zero in general since some resistance components are included in the power receiving LC resonance circuit 302.

When the drive frequency fo and resonance frequency fr1 coincide with each other, the impedance Z becomes minimum and the power receiving LC resonance circuit 302 are in a resonance state. When the drive frequency fo and resonance frequency fr1 deviate from each other, one of the capacitive reactance and inductive reactance prevails the other, so that the impedance Z is also increased.

When the drive frequency fo and resonance frequency fr1 coincide with each other, AC current I2 flows in the feeding coil L2 at resonance frequency fr1 and AC current I3 flows in the receiving coil circuit 130 also at resonance frequency fr1. As the receiving coil L3 and capacitor C3 in the receiving coil circuit 130 resonate at resonance frequency fr1, the efficiency of power transmission from the feeding coil L2 to the receiving coil L3 becomes highest.

When the drive frequency fo deviates from resonance frequency fr1, AC current I2 flows at non-resonance frequency. The power transmission efficiency is rapidly degraded because the feeding coil L2 and the receiving coil L3 cannot resonate magnetically.

Figure 7:
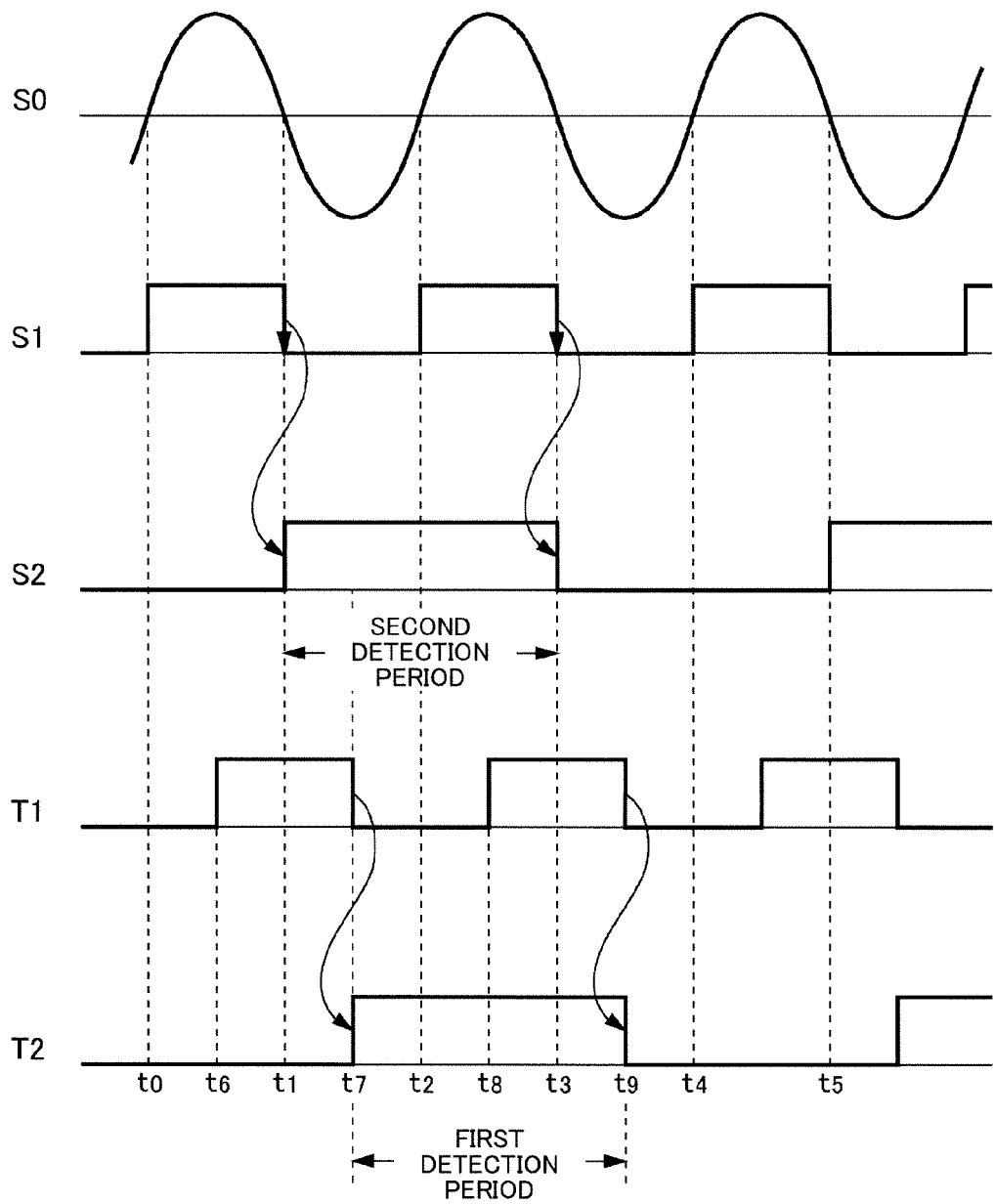
FIG. 7 is a time chart illustrating changing processes of signals S1, S2, T1, and T2 when the drive frequency and resonance frequency coincide with each other.

FIG. 7 is a time chart illustrating changing processes of the signals S1, S2, T1, and T2 when the drive frequency fo and resonance frequency fr1 coincide with each other. During time period from time t0 to time t1 (hereinafter, referred to as "first period"), current flows in the positive direction. In the case where the drive frequency fo and resonance frequency fr1 coincide with each other, the period during which the AC current Vo generated by the power transmission control circuit 200 is positive completely coincides with the first period. During period from time t1 to time t2 (hereinafter, referred to as "second period"), current flows in the negative direction. In the case where the drive frequency fo and resonance frequency fr1 coincide with each other, the period during which the AC voltage Vo is negative completely coincides with the second period.

The analog voltage waveform signal S0 representing the current phase is converted into the digital signal S1 by the rectification circuit 102. The negative component of the signal S1 is cut by the diode 124. The current waveform dividing circuit 104 inverts the level of the output signal S2 every time when it detects the falling edge of the signal S1. In the case of FIG. 7, the signal S2 assumes a high level at time t1 and changes to a low level at time t3. As a result, even though the duty ratio of the signal S1 is not 50%, it is possible to generate the signal S2 of a duty ratio of 50% corresponding to the change period of the signal S1.

The rising edge and falling edge of the digital voltage waveform signal T0 representing the voltage phase completely synchronize with those of the S1 signal in a resonance state. The signal T0 is delayed in phase by 90° by the phase adjustment circuit 108 to be the signal T1. As a result, the signal T1 changes to a high level at time t6 which is the middle point between time t0 and time t1 and changes to a low level at time t7 which is the middle point between time t1 and time t2. The voltage waveform dividing circuit 110 inverts the level of the output signal T2 every time it detects the falling edge of the signal T1.

With the above processing, in a resonant state, the period (hereinafter, referred to as "first detection period") during which the signal T2 assumes a high level delays by 90° with respect to the period (hereinafter, referred to as "second detection period") during which the signal S2 assumes a high level.

Figure 8:
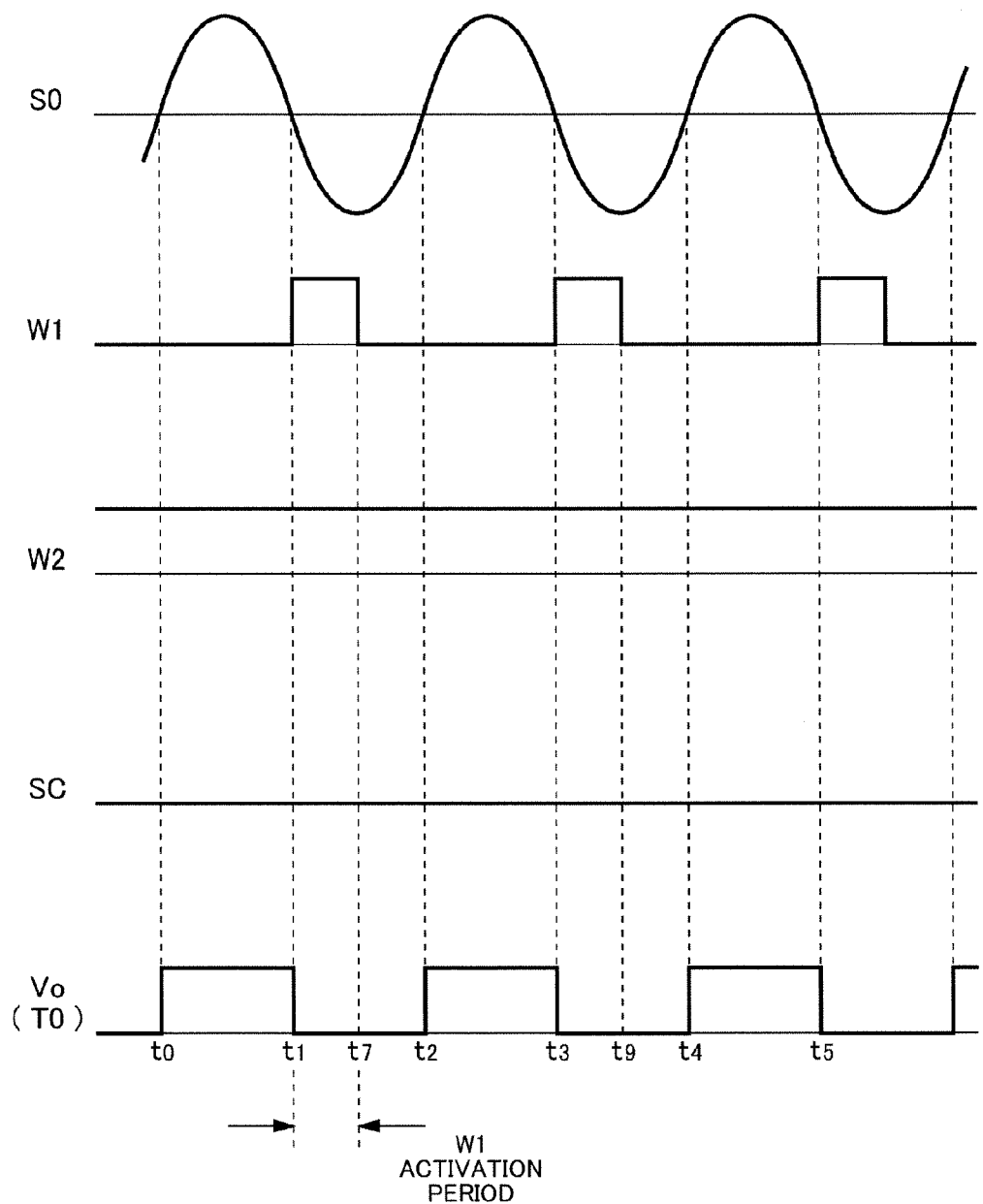
FIG. 8 is a time chart illustrating changing processes of signals W1, W2, SC, and AC voltage Vo when the drive frequency and resonance frequency coincide with each other.

FIG. 8 is a time chart illustrating changing processes of the signals W1, W2, SC, and AC voltage Vo when the drive frequency fo and resonance frequency fr1 coincide with each other. The signal W1 is formed as the exclusive OR of the signal S2 and signal T2. In other words, the signal W1 assumes a high level only when one of the first and second detection periods exhibits a high level and the other one of them exhibits a low level. As is clear from FIG. 7, the signal W1 assumes a high level during time t1 to time t7 and during time t3 to time t9. Hereinafter, the period (period from time t1 to time t7 or period from time t3 to time t9) during which the signal W1 assumes a high level is referred to as "W1 activation period". The length of the W1 activation period at the resonance time corresponds to ¼ period.

Figure 12:
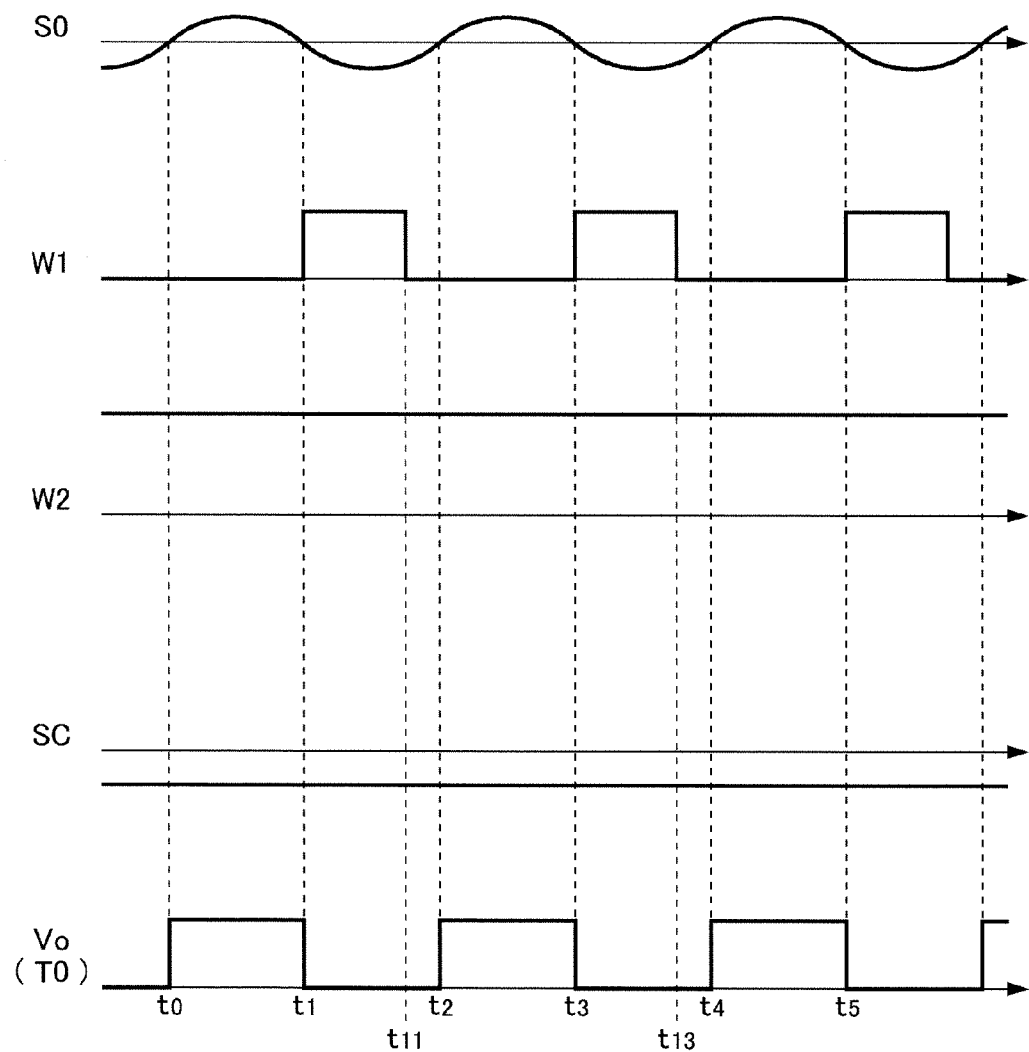
FIG. 12 is a time chart illustrating changing processes of the signals W1, W2, SC, and AC voltage Vo when the drive frequency is lower than the resonance frequency.
Figure 14:
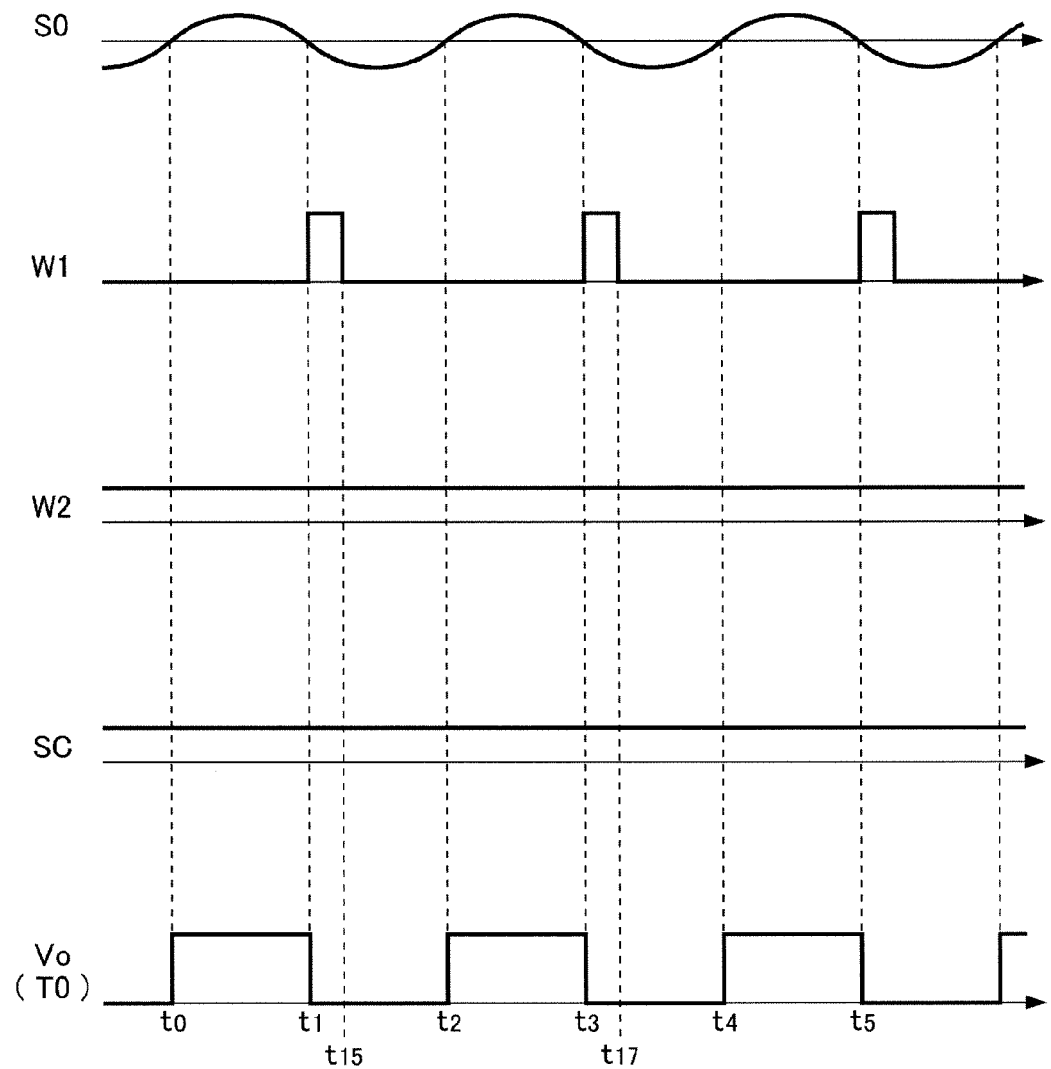
FIG. 14 is a time chart illustrating changing processes of the signals W1, W2, SC, and AC voltage Vo when the drive frequency is higher than the resonance frequency.

The low-pass filter 112 converts the signal W1 into a DC signal to generate the signal W2. The longer the W1 activation time period, the higher the level of the signal W2 becomes. The comparison circuit 114 compares the reference voltage Vref and signal W2. The reference voltage Vref is previously set so as to be equal to the level of the signal W2 in a resonant state. Thus, in a resonant state, the signal SC output from the comparison circuit 114 is zero in level. The power transmission control circuit 200 does not change the drive frequency fo when the signal SC assumes a zero level, so that the resonant state is maintained. The waveforms of Vo (T0) in FIGS. 8, 12 and 14 represent the AC voltage Vo (T0) after adjustment based on the signal SC. Especially, in FIG. 8 the waveform of AC voltage V0 (T0) is not changed after adjustment process.

Figure 9:
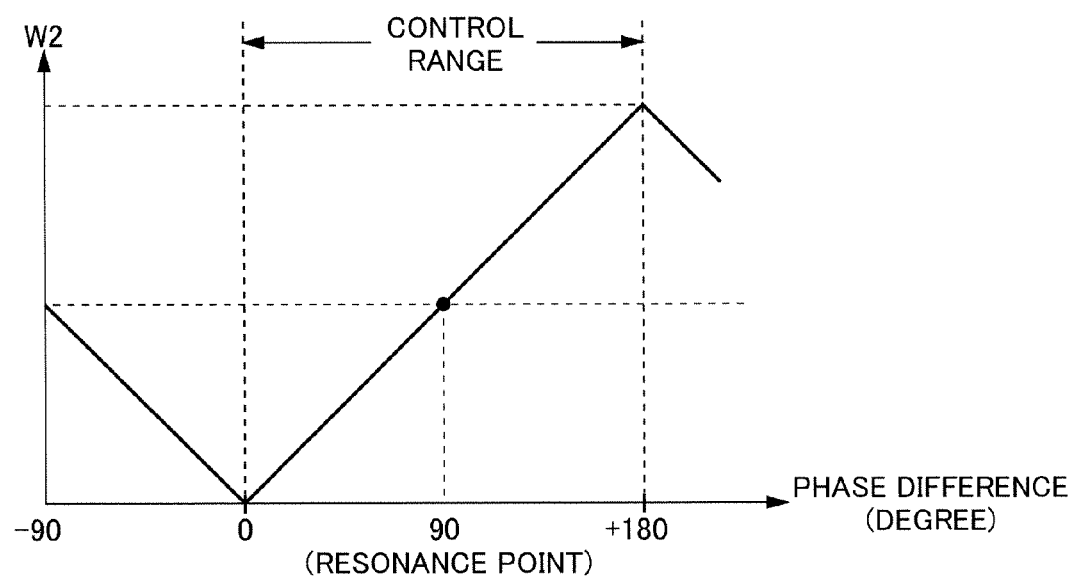
FIG. 9 is a graph illustrating the relationship between the phase difference and signal W2.

FIG. 9 is a graph illustrating the relationship between the phase difference and signal W2. As described above, when the phase difference between the first and second detection periods is 90°, the drive frequency fo coincides with the resonance frequency fr1. This phase difference is detected in a range of from 0° to 180°, and the drive frequency fo is adjusted in accordance with the detected phase difference. When the phase difference is greater than 90°, that is, the current phase advances with respect to the voltage phase, the level of the signal W2 becomes high. When the phase difference is less than 90°, that is, the current phase delays with respect to the voltage phase, the level of the signal W2 becomes low.

Figure 10:
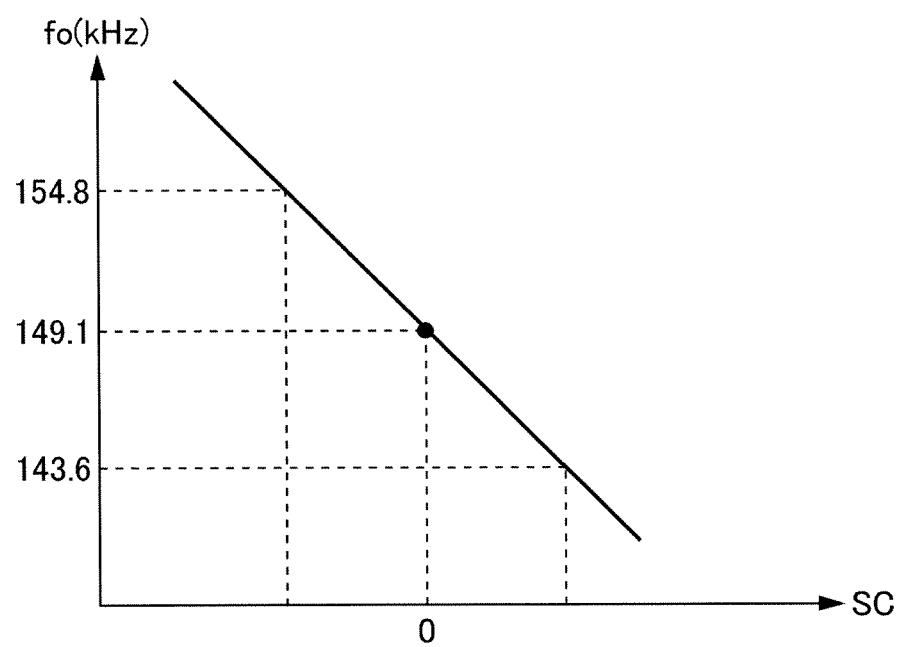
FIG. 10 is a graph illustrating the relationship between the signal SC and drive frequency.

FIG. 10 is a graph illustrating the relationship between the signal SC and drive frequency fo. When the drive frequency fo and resonance frequency fr1 coincide with each other, the signal SC assumes zero. In the present embodiment, the resonance frequency fr1 when the inter-coil distance is 22 mm which is the normal setting is 149.1 kHz. When the inter-coil distance is reduced to 14 mm, the resonance frequency is reduced to 143.6 kHz. At this time, the level of the signal SC is increased. When the level of the signal SC is increased, the power transmission control circuit 200 reduces the drive frequency fo so as to make the drive frequency fo and resonance frequency fr1 coincide with each other. On the other hand, when the inter-coil distance is increased to 30 mm, the resonance frequency fr1 is increased to 154.8 kHz. At this time, the level of the signal SC is reduced. When the level of the signal SC is reduced, the power transmission control circuit 200 increases the drive frequency fo so as to make the drive frequency fo and resonance frequency fr1 coincide with each other. Next, a mechanism of feedback control will be described for cases where the drive frequency fo is higher than and lower than the resonance frequency fr1, respectively.

Figure 11:
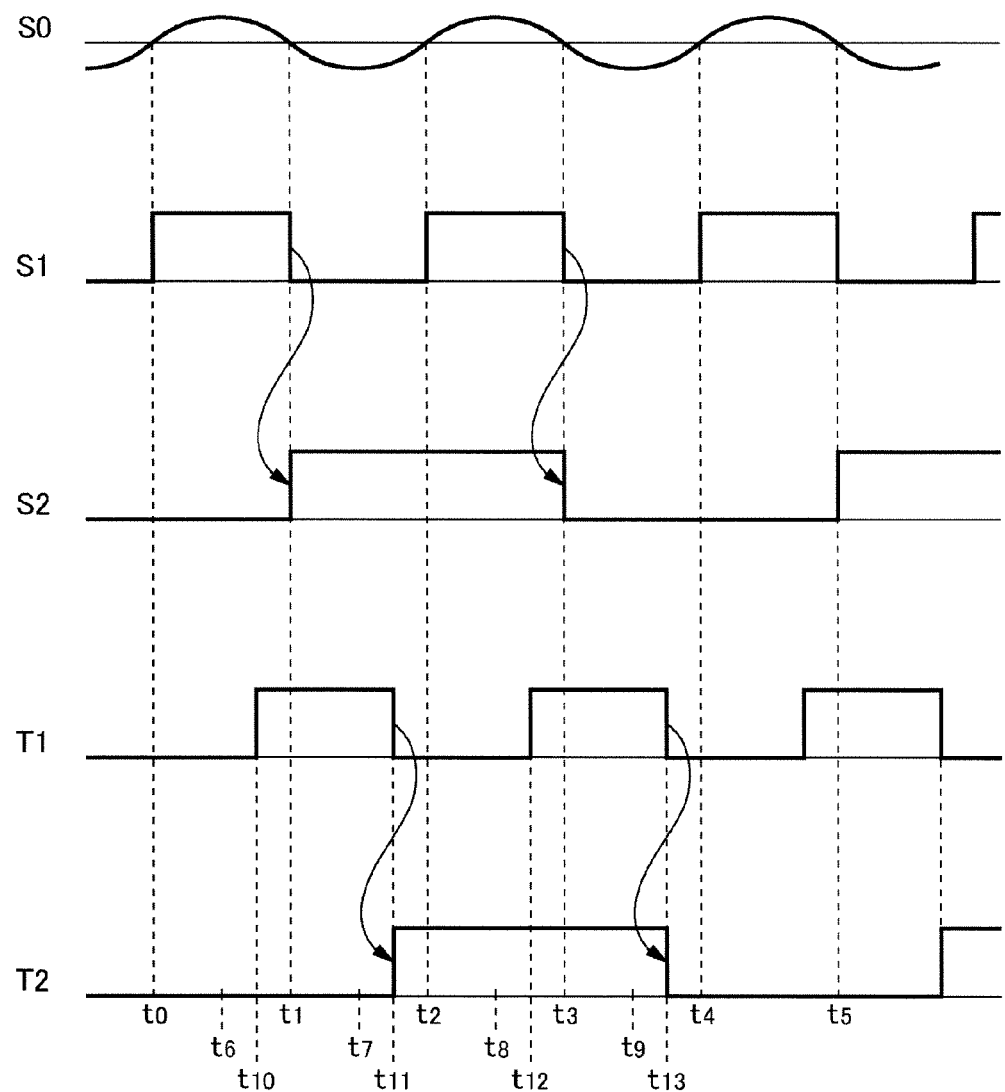
FIG. 11 is a time chart illustrating changing processes of the signals S1, S2, T1, and T2 when the drive frequency is lower than the resonance frequency.

FIG. 11 is a time chart illustrating changing processes of the signals S1, S2, T1, and T2 when the drive frequency fo is lower than the resonance frequency fr1. When the drive frequency fo is lower than the resonance frequency fr1, the period during which the AC voltage Vo is positive starts later than the first period. Thus, when the drive frequency fo is lower than the resonance frequency fr1, the rising edge and falling edge of the signal T0 occur later than those of the signal S1. The phase of the signal T0 is further delayed by 90° by the phase adjustment circuit 108 to be the signal T1. As a result, the signal T1 changes to a high level at time t10 which is later than time t6 and changes to a low level at time t11 which is later than time t7.

As described above, when the drive frequency fo is lower than the resonance frequency fr1, the first detection period during which the signal T2 assumes a high level starts later by more than 90° than the second detection period during which the signal S2 assumes a high level.

FIG. 12 is a time chart illustrating changing processes of the signals W1, W2, SC, and AC voltage Vo when the drive frequency fo is lower than the resonance frequency fr1. As is clear from FIG. 12, the signal W1 assumes a high level during the period from time t1 to t11 and period from time t3 to t13. That is, the W1 activation period becomes longer than that at the resonance time.

The low-pass filter 112 converts the signal W1 into a DC signal to generate the signal W2. Since the W1 activation period becomes longer, the signal W2 obtained when the drive frequency fo is lower than the resonance frequency fr1 becomes higher than that at the resonance time. The comparison circuit 114 compares the reference voltage Vref and signal W2. Since the level of the signal W2 is higher than that of the reference voltage Vref, the signal SC assumes a negative value. The power transmission control circuit 200 increases the drive frequency fo when the signal SC assumes a negative value according to the relationship of FIG. 10. As a result, the drive frequency fo tracks the resonance frequency fr1.

Figure 13:
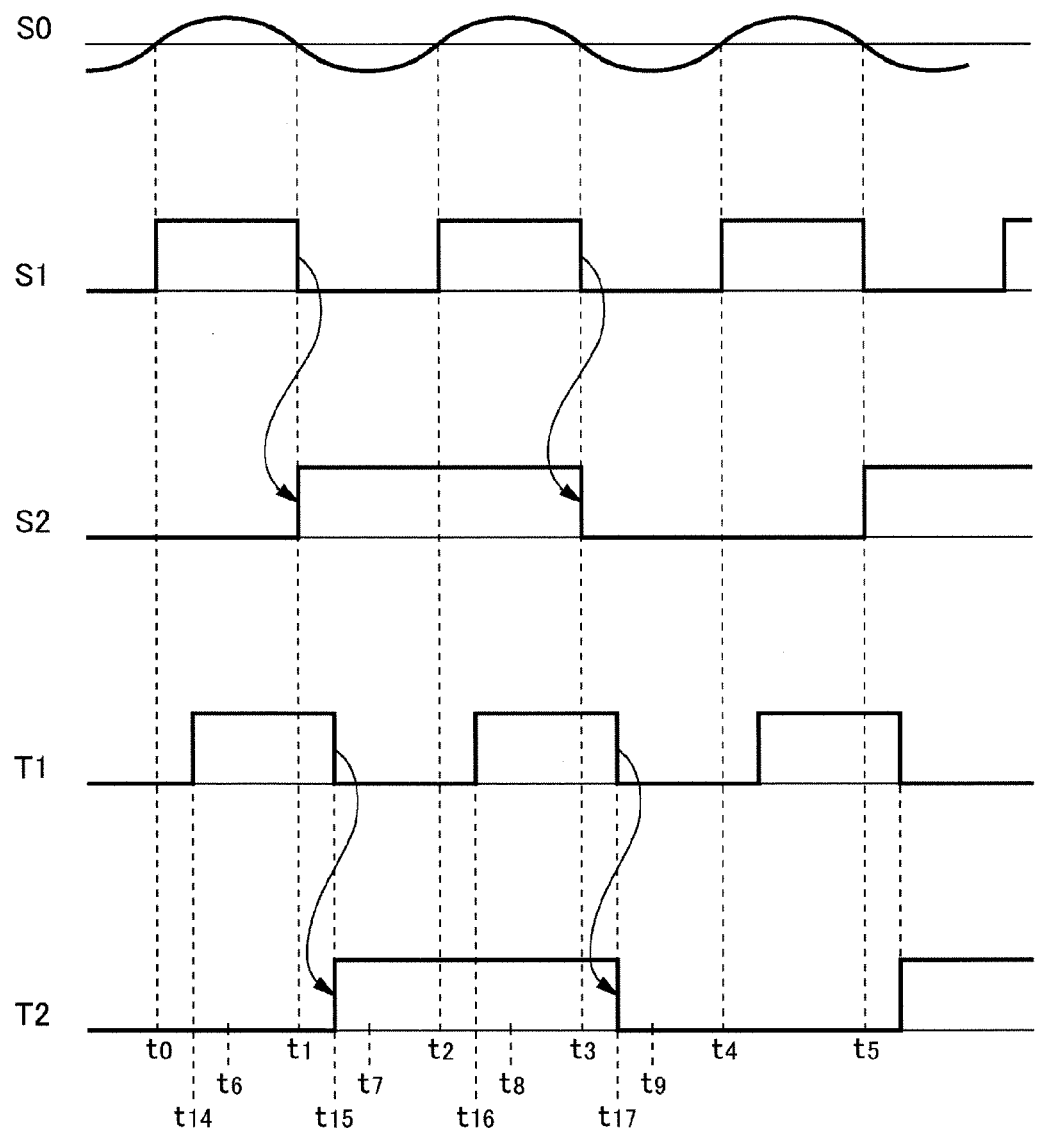
FIG. 13 is a time chart illustrating changing processes of the signals S1, S2, T1, and T2 when the drive frequency is higher than the resonance frequency.

FIG. 13 is a time chart illustrating changing processes of the signals S1, S2, T1, and T2 when the drive frequency fo is higher than the resonance frequency fr1. When the drive frequency fo is higher than the resonance frequency fr1, the period during which the AC voltage Vo is positive advances in phase with respect to the first period. Thus, when the drive frequency fo is higher than the resonance frequency fr1, the rising edge and falling edge of the signal T0 occur earlier than those of the signal S1. The phase of the signal T0 is delayed by 90° by the phase adjustment circuit 108 to be the signal T1. As a result, the signal T1 changes to a high level at time t14 which is earlier than time t6 and changes to a low level at time t15 which is earlier than time t7.

As described above, when the drive frequency fo is higher than the resonance frequency fr1, the delay of the first detection period with respect to the second detection period is less than 90°.

FIG. 14 is a time chart illustrating changing processes of the signals W1, W2, SC, and AC voltage Vo when the drive frequency fo is higher than the resonance frequency fr1. As is clear from FIG. 13, the signal W1 assumes a high level during the period from time t1 to t15 and period from time t3 to t17. That is, the W1 activation period becomes shorter than that at the resonance time.

The low-pass filter 112 converts the signal W1 into a DC signal to generate the signal W2. Since the W1 activation period becomes shorter, the signal W2 obtained when the drive frequency fo is higher than the resonance frequency fr1 becomes lower than that at the resonance time. The comparison circuit 114 compares the reference voltage Vref and signal W2. Since the level of the signal W2 is lower than that of the reference voltage Vref, the signal SC assumes a positive value. The power transmission control circuit 200 reduces the drive frequency fo when the signal SC assumes a positive value according to the relationship of FIG. 10. As a result, the drive frequency fo tracks the resonance frequency fr1.

Second Embodiment

Figure 15:
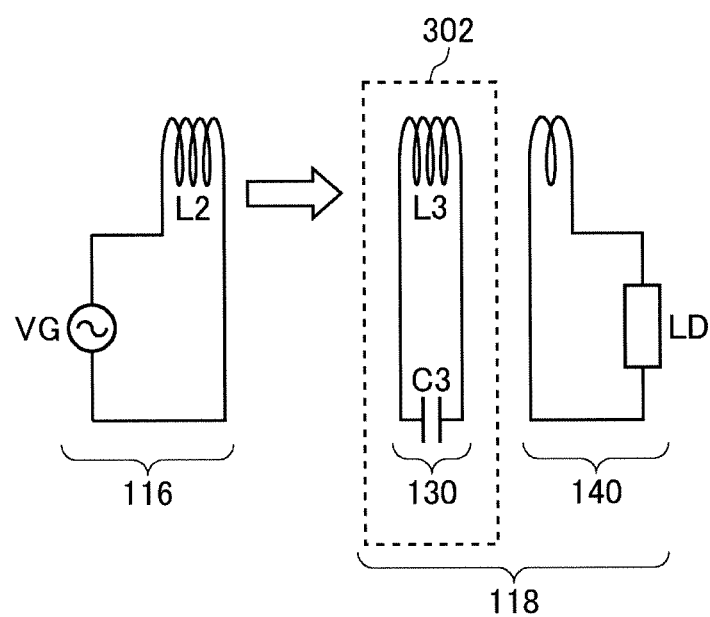
FIG. 15 is a view illustrating operation principle of a wireless power transmission system according to a second embodiment of the present invention.

FIG. 15 is a view illustrating operation principle of the wireless power transmission system 100 according to a second embodiment. The wireless power transmission system 100 according to the second embodiment includes the wireless power feeder 116 and wireless power receiver 118. However, although the wireless power receiver 118 includes the power receiving LC resonance circuit 302, the wireless power feeder 116 does not include the power feeding LC resonance circuit 300. That is, the feeding coil L2 does not constitute a part of the LC resonance circuit. More specifically, the feeding coil L2 does not form any resonance circuit with other circuit elements included in the wireless power feeder 116. No capacitor is connected in series or in parallel to the feeding coil L2. Thus, the feeding coil L2 does not resonate in a frequency at which power transmission is performed.

The power feeding source VG supplies AC current of the resonance frequency fr1 to the feeding coil L2. The feeding coil L2 does not resonate but generates an AC magnetic field of the resonance frequency fr1. The receiving LC resonance circuit 302 resonates by receiving the AC magnetic field. As a result, large AC current flows in the power receiving LC resonance circuit 302. Studies conducted by the present inventor have revealed that formation of the LC resonance circuit is not essential in the wireless power feeder 116. The feeding coil L2 does not constitute a part of the power feeding LC resonance circuit, so that the wireless power feeder 116 does not resonate at the resonance frequency fr1. It has been generally believed that, in the wireless power feeding of a magnetic field resonance type, making resonance circuits which are formed on both the power feeding side and power receiving side resonate at the same resonance frequency fr1 (=fr0) allows power feeding of large power. However, it is found that even in the case where the wireless power feeder 116 does not contain the power feeding LC resonance circuit 300, if the wireless power receiver 118 includes the power receiving LC resonance circuit 302, the wireless power feeding of a magnetic field resonance type can be achieved.

Even when the feeding coil L2 and receiving coil L3 are magnetic-field-coupled to each other, a new resonance circuit (new resonance circuit formed by coupling of resonance circuits) is not formed due to absence of the capacitor C2. In this case, the stronger the magnetic field coupling between the feeding coil L2 and receiving coil L3, the greater the influence exerted on the resonance frequency of the power receiving LC resonance circuit 302. By supplying AC current of this resonance frequency, that is, a frequency near the resonance frequency fr1 to the feeding coil L2, the wireless power feeding of a magnetic field resonance type can be achieved. In this configuration, the capacitor C2 need not be provided, which is advantageous in terms of size and cost.

Figure 16:
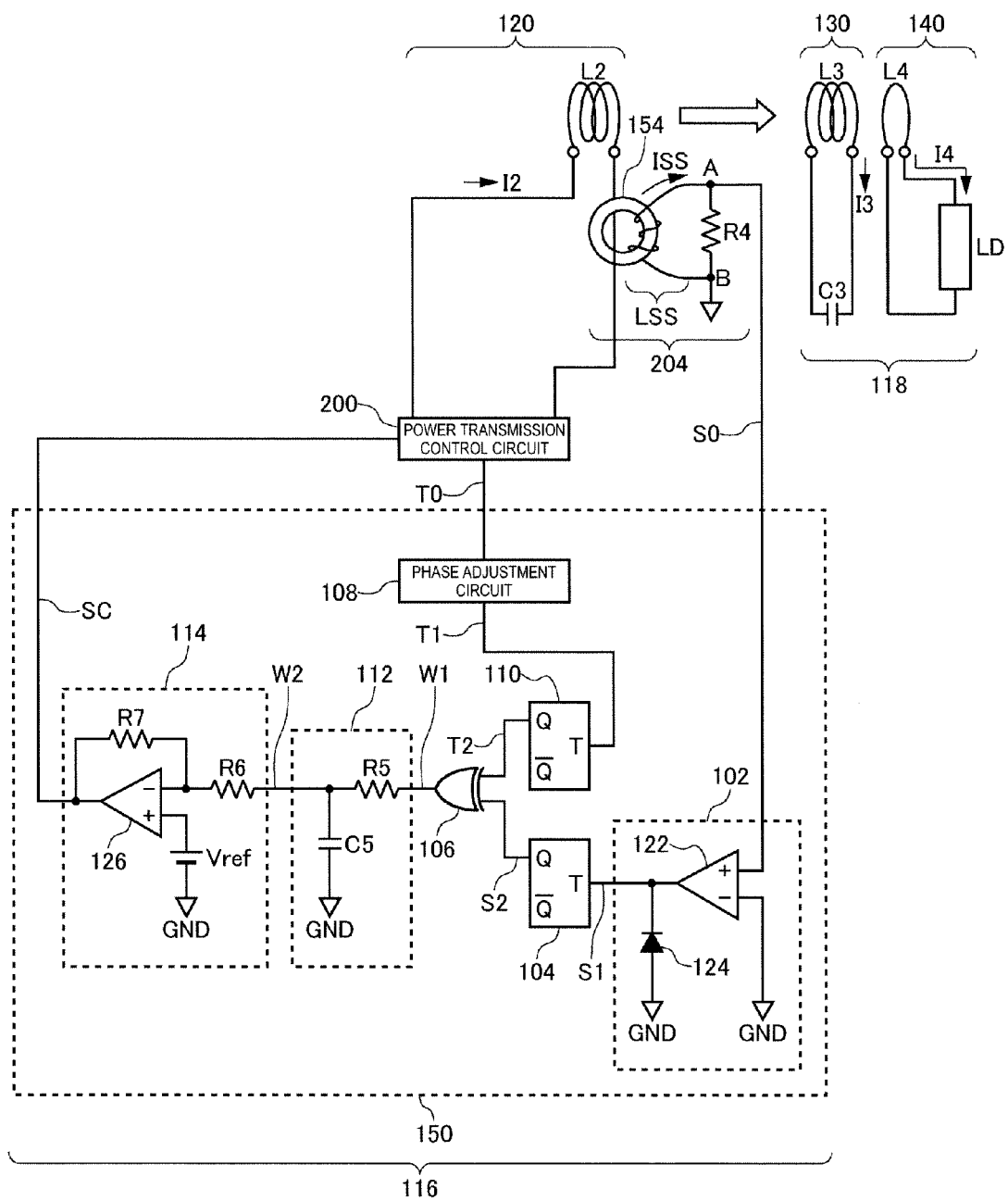
FIG. 16 is a system configuration view of the wireless power transmission system according to the second embodiment.

FIG. 16 is a system configuration view of the wireless power transmission system 100 according to the second embodiment. In the wireless power transmission system 100 according to the second embodiment, the capacitor C2 is omitted. Further, the feeding coil L2 is directly connected to the power transmission control circuit 200 not through the coupling transformer TS1.

In the case where the feeding coil circuit 120 is an LC resonance circuit, power is preferably supplied to the feeding coil circuit 120 with low voltage and high current. To this end, it is necessary for the voltage and current to be adjusted by the coupling transformer TS1. However, in the case of the wireless power feeder 116 according to the second embodiment, the feeding coil L2 need not be made to resonate, which makes it possible to apply high voltage to the feeding coil L2. This can eliminate the need to provide the coupling transformer TS1, thereby further reducing the size of the wireless power feeder 116.

The wireless power transmission system 100 according to the present embodiment has thus been described. In the case of the wireless feeding of a magnetic field resonance type, the coincidence degree between the resonance frequency fr1 and drive frequency fo gives great influence on the power transmission efficiency. The wireless power transmission systems 100 of the first and second embodiments can detect the deviation between the resonance frequency fr1 and drive frequency fo to allow the drive frequency fo to autonomously track the resonance frequency fr1, making it easy to maintain the power transmission efficiency at its maximum value even if use conditions are changed.

The present invention has been described based on the above embodiment. It should be understood by those skilled in the art that the above embodiment is merely exemplary of the invention, various modifications and changes may be made within the scope of the claims of the present invention, and all such variations may be included within the scope of the claims of the present invention. Thus, the descriptions and drawings in this specification should be considered as not restrictive but illustrative.

The "AC power" used in the wireless power transmission system 100 may be transmitted not only as an energy but also as a signal. Even in the case where an analog signal or digital signal is fed by wireless, the wireless power feeding method of the present invention may be used.

In the present embodiment, the deviation between the drive frequency fo and resonance frequency fr1 is detected based on the length of the W1 activation period which is a period specified by the exclusive OR of the first and second detection periods. As a modification, the deviation between the drive frequency fo and resonance frequency fr1 may be detected based on the length of the W1 activation period which is a period specified by the logical AND or logical OR of the first and second detection periods. That is, various logical operations may be applied in addition to the exclusive OR.

What is claimed is:

1. A wireless power feeder for feeding power by wireless from a feeding coil to a receiving coil using a magnetic field resonance phenomenon between the feeding coil and receiving coil, the power feeder comprising:
   the feeding coil;
   a power transmission control circuit that supplies AC power at a drive frequency to the feeding coil so as to make the feeding coil feed AC power to the receiving coil; and
   a phase detection circuit that detects the phase difference between the voltage phase and current phase of the AC power, wherein
   the phase detection circuit detects the deviation between a first detection period during which the voltage level of the AC power falls within a predetermined range and a second detection period during which the current level of the AC power falls within a predetermined range to detect the phase difference.

2. The wireless power feeder according to claim 1, wherein the phase detection circuit detects the length of the period specified as the exclusive OR of the first and second detection periods to detect the phase difference.

3. The wireless power feeder according to claim 1, wherein the power transmission control circuit adjusts the drive frequency so as to reduce the detected phase difference.

4. The wireless power feeder according to claim 1, wherein the phase detection circuit rectifies both or one of the voltage waveform and current waveform into a digital waveform before detecting the phase difference.

5. The wireless power feeder according to claim 1, wherein the phase detection circuit detects the phase difference after shifting one of the phases of the voltage waveform and current waveform.

6. The wireless power feeder according to claim 1, wherein the phase detection circuit detects the phase difference after frequency-dividing of the current waveform.

7. The wireless power feeder according to claim 1, wherein the phase detection circuit detects the phase difference after frequency-dividing of the voltage waveform.

8. The wireless power feeder according to claim 1, wherein the phase detection circuit generates a DC signal representing the magnitude of the deviation between the first and second detection periods and detects the phase difference based on the level of the DC signal.

9. The wireless power feeder according to claim 1, wherein the power transmission control circuit makes the feeding coil that does not substantially resonate with circuit elements on the power feeding side feed the AC power to the receiving coil.

10. The wireless power feeder according to claim 1, wherein
the feeding coil does not form, together with circuit elements on the power feeding side, a resonance circuit having a resonance point corresponding to the resonance frequency of the receiving coil.

11. The wireless power feeder according to claim 1, wherein
no capacitor is connected in series or in parallel to the feeding coil.

12. The wireless power feeder according to claim 1, wherein
the power transmission control circuit directly supplies the AC power to the feeding coil not through a coupling transformer.

* * * * *